(12) United States Patent
Coenegracht et al.

(10) Patent No.: US 10,230,230 B2
(45) Date of Patent: Mar. 12, 2019

(54) SEALING BLOCK ARRANGEMENTS FOR ENCLOSURES

(71) Applicant: CommScope Connectivity Belgium BVBA, Kessel-Lo (BE)

(72) Inventors: Philippe Coenegracht, Hasselt (BE); Alexandre Caroline M. De Bie, Beauvechain (BE); Maddy Nadine Frederickx, Aarschot (BE); Paul Joseph Claes, Tremelo (BE); Geert Van Genechten, Vorselaar (BE); Mohamed Aznag, Scherpenheuvel (BE); Diederik Houben, Berbroek (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 15/760,198

(22) PCT Filed: Sep. 13, 2016

(86) PCT No.: PCT/EP2016/071521
§ 371 (c)(1),
(2) Date: Mar. 14, 2018

(87) PCT Pub. No.: WO2017/046064
PCT Pub. Date: Mar. 23, 2017

(65) Prior Publication Data
US 2018/0254621 A1  Sep. 6, 2018

Related U.S. Application Data

(60) Provisional application No. 62/218,274, filed on Sep. 14, 2015.

(51) Int. Cl.
*H02G 15/013* (2006.01)
*H02G 3/22* (2006.01)
(Continued)

(52) U.S. Cl.
CPC ........... *H02G 15/013* (2013.01); *H02G 3/083* (2013.01); *H02G 3/22* (2013.01); *H02G 15/007* (2013.01); *H02G 15/10* (2013.01); *H02G 15/113* (2013.01)

(58) Field of Classification Search
CPC .................................................. H02G 15/013
See application file for complete search history.

(56) References Cited

U.S. PATENT DOCUMENTS 3,830,954 A * 8/1974 Caudill ................. H02B 1/305
  174/362
4,733,016 A * 3/1988 Twist ....................... F16L 5/08
  174/657

(Continued)

FOREIGN PATENT DOCUMENTS

EP       2 523 287 A1   11/2012
WO        97/02635 A1    1/1997
(Continued)

OTHER PUBLICATIONS

International Search Report and Written Opinion of the International Searching Authority for corresponding International Patent Application No. PCT/EP2016/071521 dated Nov. 28, 2016, 14 pages.

*Primary Examiner* — Hung V Ngo
(74) *Attorney, Agent, or Firm* — Merchant & Gould P.C.

(57) ABSTRACT

A sealing unit (120) includes opposing sealing blocks (122) that are biased together. Each sealing block (122) includes a volume of sealant (124) contained between two containment wall sections (125). Each containment wall section (125) defines a plurality of notches (127) of various sizes. The notches (127) of the containment wall sections (125) of each sealing block (122) align with each other to define cable passages across the sealant (124). The sealing blocks (122) can be rotated to mate similarly sized notches (127) to define a cable port (126) leading to a sealing interface between the volumes of sealant (124). An inner diameter of the cable port (126) can be selected based on selecting which notches (127) to mate.

21 Claims, 7 Drawing Sheets

(51) Int. Cl.
  *H02G 15/113* (2006.01)
  *H02G 3/08* (2006.01)
  *H02G 15/007* (2006.01)
  *H02G 15/10* (2006.01)

(56) References Cited

U.S. PATENT DOCUMENTS

| | | | |
|---|---|---|---|
| 5,416,271 A * | 5/1995 | Birmingham | F16L 5/08 |
| | | | 174/657 |
| 5,783,776 A * | 7/1998 | Birmingham | F16L 5/08 |
| | | | 174/657 |
| 5,938,152 A * | 8/1999 | Kreutz | F16L 5/08 |
| | | | 174/656 |
| 8,674,240 B2 * | 3/2014 | Karlsson | F16L 5/08 |
| | | | 174/652 |
| 2010/0001476 A1 * | 1/2010 | Broder | F16L 5/08 |
| | | | 277/606 |
| 2012/0032036 A1 | 2/2012 | Andersson et al. | |

FOREIGN PATENT DOCUMENTS

| WO | 97/02636 A1 | 1/1997 |
|---|---|---|
| WO | 2010/090583 A1 | 8/2010 |

* cited by examiner

SEALING BLOCK ARRANGEMENTS FOR ENCLOSURES

CROSS-REFERENCE TO RELATED APPLICATION

This application is a National Stage Application of PCT/EP2016/071521, filed on Sep. 13, 2016, which claims the benefit of U.S. Patent Application Ser. No. 62/218,274, filed on Sep. 14, 2015, the disclosures of which are incorporated herein by reference in their entireties. To the extent appropriate, a claim of priority is made to each of the above disclosed applications.

BACKGROUND

Cables are often routed through various structures such as an enclosure. The interior of the enclosure may be a protected environment while the exterior of the enclosure may be an unprotected environment subject to varying conditions, such as inclement weather, heat, cold, dirt, debris, moisture, sunlight, and/or the like. To pass the cable into or out of the interior of the enclosure, the cable is received through an opening within the structure.

While the opening provides access to the interior of the enclosure, the opening may also allow undesirable substances into the protected enclosure and/or may expose the interior of the enclosure. For example, the opening may allow dirt, debris, and/or moisture into the enclosure, and/or may expose the interior of the enclosure to inclement weather, heat, cold, and/or sunlight. Cable entry seals are typically used to seal the opening within the structure through which the cable is received. In some cases, cable entry seals include a body that extends through, and is sealingly engaged with, the structure opening. The body includes a passageway for receiving the cable therethrough.

Improvements are desired.

SUMMARY

Some aspects of the disclosure are directed to an enclosure including a first housing piece defining a first receptacle a which is defined a first notch; a second housing piece defining a second receptacle at which is defined a second notch sized to cooperate with the first notch to define a cable port leading to an enclosure interior; and a sealing unit disposed in the first and second receptacles. The sealing unit includes a containment wall defining a cable port leading to a cable interface between first and second volumes of sealant. The sealing unit is configurable to set an inner diameter of the cable port without adding material to or removing material from the sealing unit.

In certain implementations, the sealing unit includes a first spring element disposed in the first receptacle; a second spring element disposed in the second receptacle; a first sealing block seated on the first spring element within the first receptacle; and a second sealing block seated on the second spring element within the second receptacle. Each of the first and second sealing blocks includes a respective containment wall section and the respective volume of sealant. Each containment wall section has external edges that each define a notch. Each of the notches of each containment wall section is sized differently than the other notches of the containment wall section. The first containment wall section and the second containment wall section cooperate to define the containment wall of the sealing unit.

In certain implementations, the first containment wall section is bonded to the first volume of sealant.

In certain implementations, the sealing unit includes two parallel containment walls disposed on opposite sides of the first and second volumes of sealant.

Other aspects of the disclosure are directed to a sealing unit including a sealant arrangement including first and second volumes of sealant that meet at a cable sealing interface; a sealant containment wall positioned at an outer side of the sealant arrangement; and one or more spring elements configured to apply a spring load to the first and second volumes of sealant. The sealant containment wall includes a first wall section providing containment of the first volume of sealant at the outer side of the sealant arrangement and a second wall section providing containment of the second volume of sealant at the outer side of the sealant arrangement. The first and second wall sections meet at a boundary that generally aligns with the cable sealing interface. The first and second wall sections each include at least first and second edges. The first edges of the first and second wall sections define first notches having a first notch size. The second edges of the first and second wall sections define second notches having a second notch size that is larger than the first notch size. The first and second wall sections are capable of being arranged in a first configuration where the first edges meet at the boundary and the first notches cooperate to define a first cable port having a first port size. The first and second wall sections also are capable of being arranged in a second configuration where the second edges meet at the boundary and the second notches cooperate to define a second cable port having a second port size that is larger than the first port size.

In certain implementations, the first wall section is bonded to an outer side of the first volume of sealant and the second wall section is bonded to an outer side of the second volume of sealant.

In certain implementations, the sealant containment wall is a first sealant containment wall. A second sealant containment wall is positioned at an inner side of the sealant arrangement. The first and second sealant containment walls have the same configuration.

In certain implementations, an enclosure defines a sealing block mount for receiving the sealing unit. In certain examples, the sealing block mount includes a first pocket for receiving the first volume of sealant and a second pocket for receiving the second volume of sealant. The first pocket is defined by a first housing piece of the enclosure and the second pocket is defined by a second housing piece of the enclosure.

In certain examples, the first and second housing pieces meet at a sealed interface including a perimeter seal pressed between the first and second housing pieces. In an example, the perimeter seal contacts the sealant of the sealant arrangement.

In certain implementations, the first and second wall sections are rectangular plates having four edges which include the first edge, the second edge, a third edge, and a fourth edge. The third edges define third notches having a third notch size larger than the second notch size.

In certain examples, the fourth edges define fourth notches having a fourth notch side larger than the third notch size.

In certain implementations, the each of the first and second wall sections include spring elements at the first and second notches. The spring element is compressible radially along the first and second notches.

In certain examples, each spring element is monolithically formed with the corresponding wall section.

Other aspects of the disclosure are directed to a sealing unit including a first sealing block and a second sealing block. The first sealing block includes a first volume of sealant sandwiched between first and second wall sections. Each of the first and second wall sections defines a plurality of notches. The notches of the first wall section are aligned with the notches of the second wall section with an exterior surface of the first volume of sealant extending therebetween. The notches of each wall section have different sizes. The second sealing block includes a second volume of sealant sandwiched between first and second wall sections. Each of the first and second wall sections of the second sealing block defining a plurality of notches. The notches of the first wall section of the second sealing block are aligned with the notches of the second wall section of the second sealing block with an exterior surface of the second volume of sealant extending therebetween. The notches of each wall section of the second sealing block have different sizes. Each of the notches of the second sealing block corresponds in size to one of the notches of the first sealing block.

In certain implementations, a first spring element and a second spring element configured to be disposed at opposite sides of the sealing unit.

In certain implementations, each of the containment wall sections defines four notches.

In certain implementations, each of the containment wall sections includes a spring member at each notch.

In certain implementations, each containment wall section is bonded to an external side of the respective volume of sealant.

Other aspects of the disclosure are directed to a method of cabling an enclosure with a cable having a first outer diameter. The method includes providing a plurality of sealing blocks including a containment wall section and a volume of sealant. The containment wall section defines notches facing in different directions. The method also includes determining the first outer diameter of the cable; determining which of the notches of the containment wall of a first of the sealing blocks corresponds to the first outer diameter of the cable; seating the first sealing block within the first receptacle so that the determined notch of the first sealing block faces outwardly; determining which of the notches of the containment wall of a second of the sealing blocks corresponds to the first outer diameter of the cable; laying a cable over the first sealing block so that the cable lays in the determined notch; seating the second sealing block within a second receptacle; and moving the second sealing block towards the first sealing block so that the determined notch of the second sealing block cooperates with the determined notch of the first sealing block to define a cable port around the cable.

In certain implementations, the method also includes positioning a spring element in a first receptacle of the enclosure. Seating the first sealing block within the first receptacle comprises seating the first sealing block on the spring element so that the determined notch of the first sealing block faces away from the spring element.

In certain implementations, the spring element is a first spring element and the method also includes positioning a second spring element in the second receptacle of the enclosure so that the determined notch of the second sealing block faces away from the second spring element.

A variety of additional inventive aspects will be set forth in the description that follows. The inventive aspects can relate to individual features and to combinations of features.

It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to a sealing unit to provide environmental sealing at a cable sealing interface. For example, such a sealing unit can be used at a port of an enclosure to enable a cable to pass through the port while inhibiting contaminants from entering the enclosure. The sealing unit includes containment walls disposed about one or more volumes of sealant. The containment walls define. The sealing unit can be rotated to face the containment wall towards a desired one of multiple ports.

Figure 1:
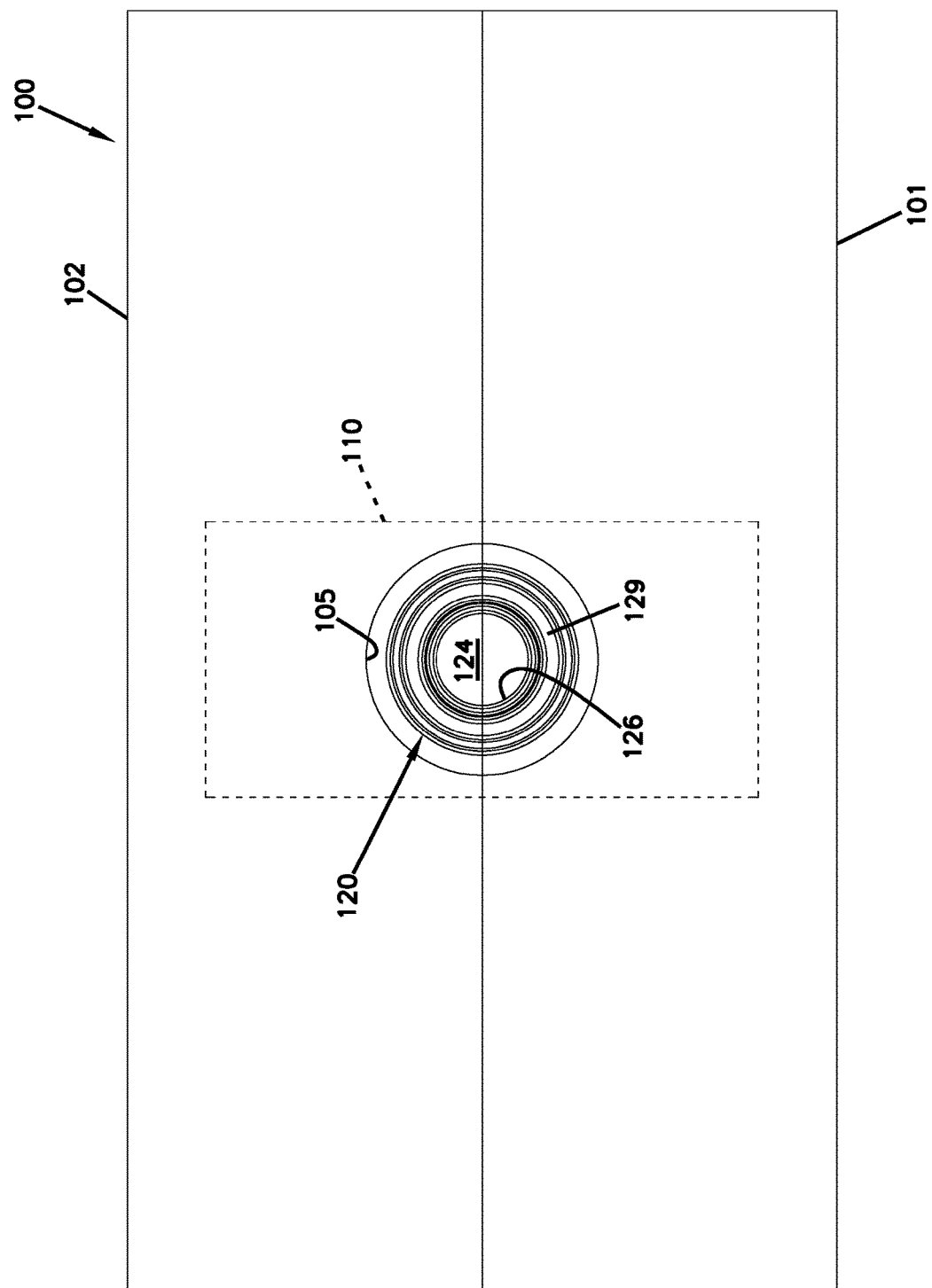
FIG. 1 is an end view of an example enclosure defining sealing block mounts at which a sealing unit is disposed so that a cable port of the sealing unit aligns with a cable port of the enclosure.

FIG. 1 illustrates an example enclosure housing 100 including a base 101 and a cover 102 that cooperate to define an interior. In some implementations, the base 101 and/or cover 102 define a channel arrangement around at least part of the periphery of the enclosure 100. One or more gaskets or other seals can be disposed in the channel arrangement to provide environmental sealing between the base 101 and cover 102 when the cover 102 is assembled on the base 101. The base 101 and the cover 102 also cooperate to define cable ports 105. For example, the base 101 defines one or more first cutout or notched sections and the cover 102 defines one or more second cutout or notched sections. The second cutout or notched sections align with the first cutout or notched sections to define the cable ports 105 when the cover 102 is assembled on the base 101.

In accordance with some of the aspects of the disclosure, the base 101 and the cover 102 cooperate to define one or more sealing block mounts 110 (e.g., shown in phantom in FIG. 1). A sealing block unit 120 (FIGS. 2-5) can be disposed in each sealing block mount 110. Each sealing unit 120 is configured to provide environmental sealing around a cable routed through one of the cable ports 105. In certain implementations, each sealing block unit 120 is disposed and configured to cooperate with the gasket or other seal disposed in the channel arrangement to provide environmental sealing to the enclosure 100. In some implementations, the sealing block mounts 110 are disposed at one or more corners of the enclosure 100. In other implementations, the sealing block mounts 110 can be disposed anywhere along a periphery of the enclosure 100.

Figure 2:
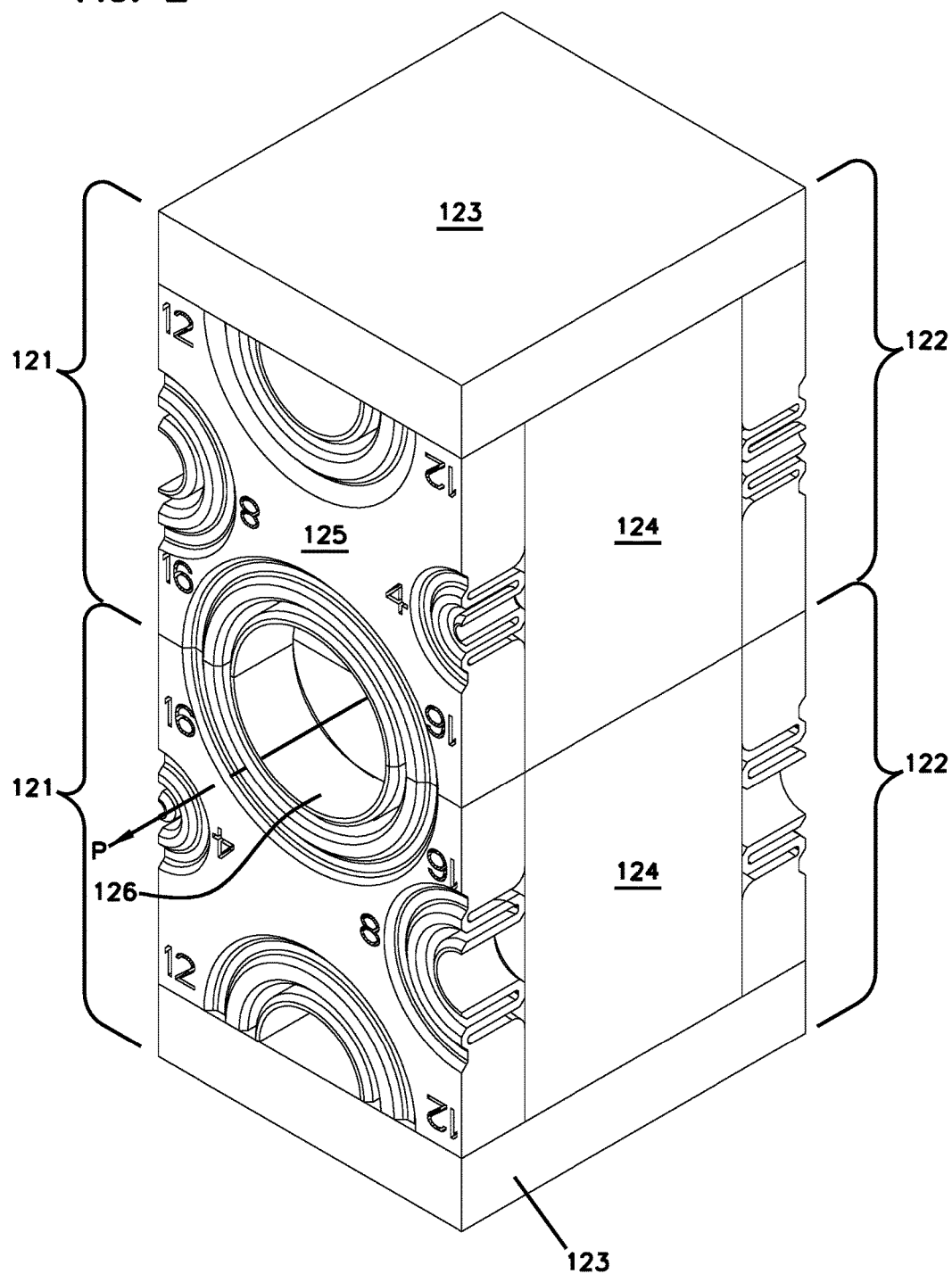
FIG. 2 is a perspective view of a sealing unit suitable for use with the enclosure of FIG. 1, the sealing unit including a first sealing arrangement opposing a second sealing arrangement.

As shown in FIG. 2, each sealing block unit 120 includes a first sealing block arrangement 121 and a second sealing block arrangement 121. Each of the first and second sealing block arrangements 121 includes a sealing block 122 and a spring element 123. Each sealing block 122 includes a volume of sealant 124 held between opposing containment wall sections 125. For example, a first containment wall section 125 is bonded to one external side of the volume of sealant 124.

The spring element 123 is positioned between the corresponding sealing block 122 and a receptacle of the sealing block mount 110. Accordingly, the spring element 123 is configured to apply pressure to the volume of sealant 124 and to accommodate deformation of the volume of sealant 124 as will be discussed in more detail herein.

In certain implementations, each of the base 101 and the cover 102 define receptacles that cooperate to define the sealing block mount 110. Each receptacle is sized and configured to receive one of the sealing block arrangements 121. Accordingly, the sealing block arrangements 121 are separated when the cover 102 is separated from the base 101. The sealing block arrangements 121 are pressed against each other when the cover 102 is installed at the base 101, thereby applying some pressure to the sealant volumes 124.

In some implementations, the volumes of sealant 124 are gel-type seals. Examples of pressurized gel-type seals are disclosed by document EP 0442941 B1 and document EP 0587616 B1. Both of these documents disclose gel-type cable seals that are pressurized through the use of threaded actuators. The volumes of sealant 124 can be pressurized by pressing the volumes 124 of two sealing blocks 122 against each other while mounted in the sealing block mounts 110. The spring elements 123 apply pressure from opposite sides of the sealing block unit 120. Positioning a cable between the volumes of sealant 124, as will be discussed herein, applies even more pressure to the sealant 124 in opposition to the spring elements 123.

In certain implementations, the sealant 124 may comprise gel and/or gel combined with another material such as an elastomer. The gel may comprise, for example, silicone gel, urea gel, urethane gel, thermoplastic gel, or any suitable gel or geloid sealing material. Gels are normally substantially incompressible when placed under a compressive force and normally flow and conform to their surroundings, thereby forming sealed contact with other surfaces. Example gels include oil-extended polymers. The polymer may, for example, comprise an elastomer or a block copolymer having relatively hard blocks and relatively elastomeric blocks. Example copolymers include styrene-butadiene or styrene-isoprene di-block or tri-block copolymers. In still other examples, the polymer of the gel may include one or more styrene-ethylene-propylene-styrene block copolymers.

Extender oils used in example gels may, for example, be hydrocarbon oils (e.g., paraffinic or naphthenic oils or polypropene oils, or mixtures thereof). The sealant 124 also can include additives such as moisture scavengers, antioxidants, tackifiers, pigments, and/or fungicides. In certain embodiments, sealing members in accordance with the principles of the present disclosure have ultimate elongations greater than 100 percent with substantially elastic deformation to an elongation of at least 100 percent. In other embodiments, sealing members in accordance with the principles of the present disclosure have ultimate elongations of at least 200 percent, or at least 500 percent, or at least 1000 percent. Ultimate elongation can be determined by the testing protocol set forth at ASTM D412.

Figure 3:
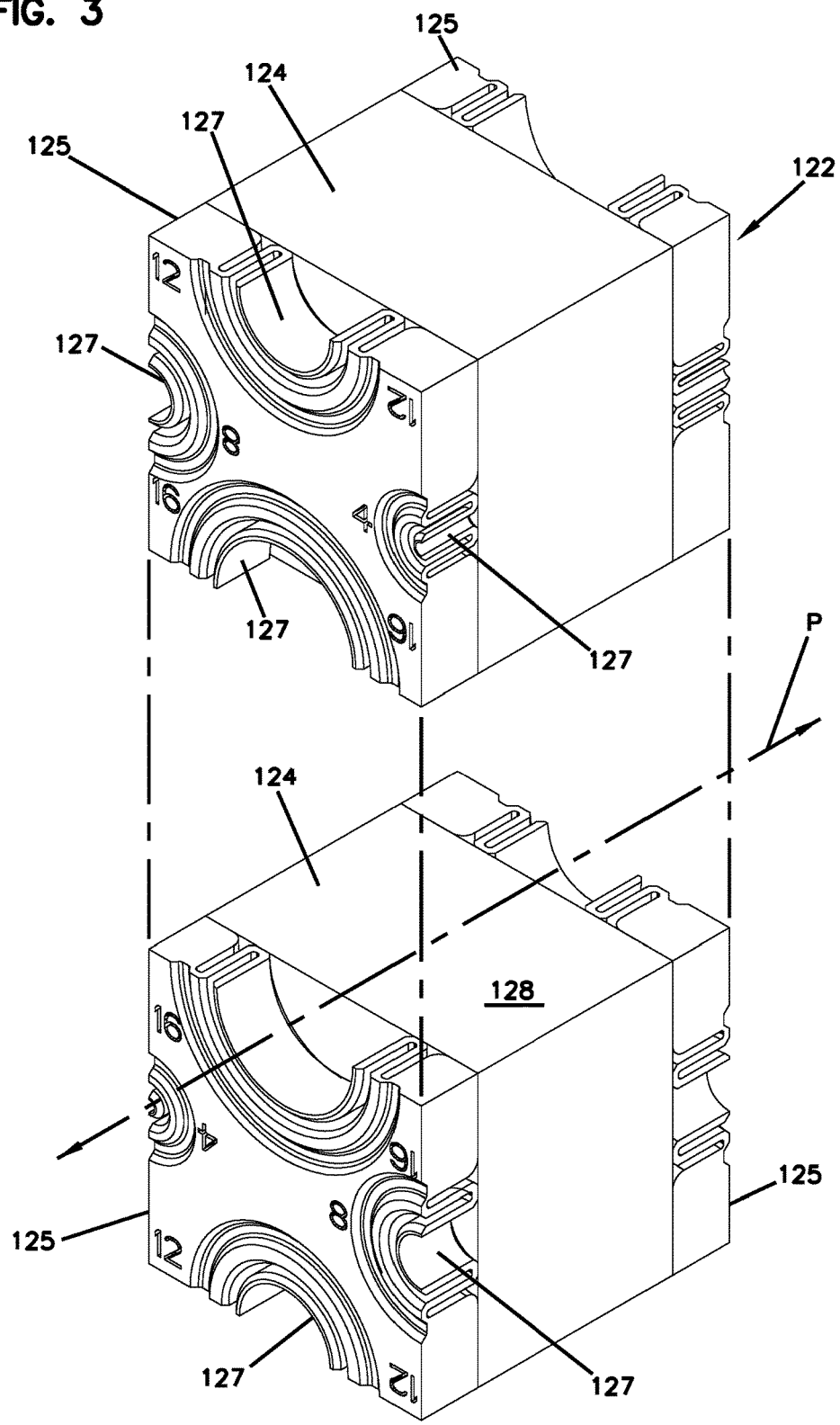
FIG. 3 is a perspective view of the opposing cable sealing arrangements of FIG. 2 exploded away from each other with spring elements removed for ease in viewing.

As shown in FIG. 3, the first and second sealing block arrangements 121 are disposed so that the volume of sealant 124 of the first sealing block arrangement 121 aligns with and opposes the volume of sealant 124 of the second sealing block arrangement 121. The first and second sealing block arrangements 121 are movable relative to each other to move the volumes of sealant 124 towards and away from each other. During cabling of the enclosure 100, a cable to be sealed is laid across a cable contact surface 128 (FIG. 3) of the first sealing block 122. To seal the cable, the first and second opposing sealing blocks 122 are pressed towards each other to sandwich the cable between respective cable contact surfaces 128. The volumes of sealant 124 deform to conform to an outer shape of the cable. The spring elements 123 compress to accommodate the deformation of the sealant 124. The spring elements 123 also apply pressure to the sealant 124, which causes the sealant 124 to press and seal against the cable.

Figure 4:
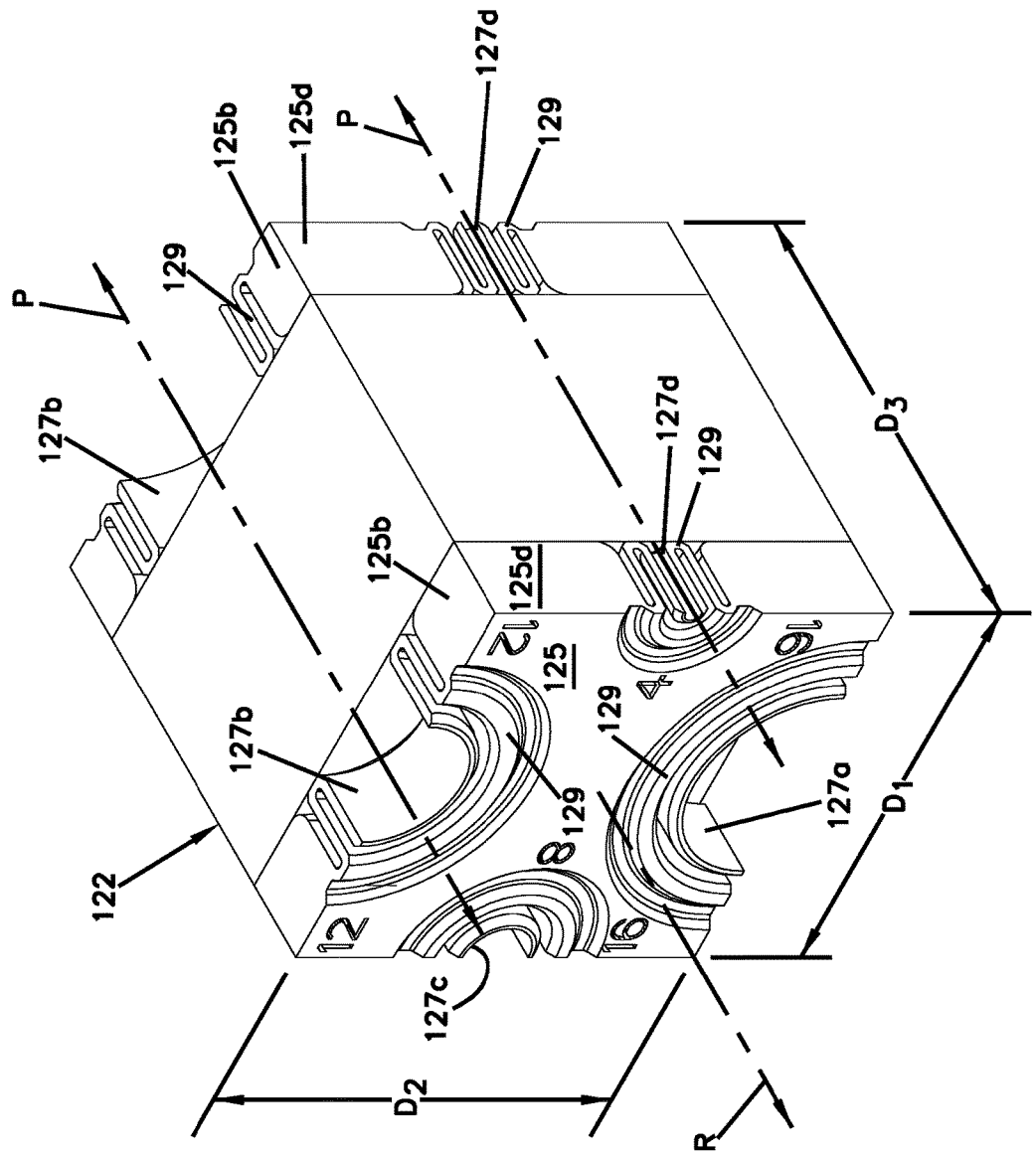
FIG. 4 is a perspective view of an example sealing block suitable for use in the sealing arrangements of FIGS. 2 and 3.
Figure 5:
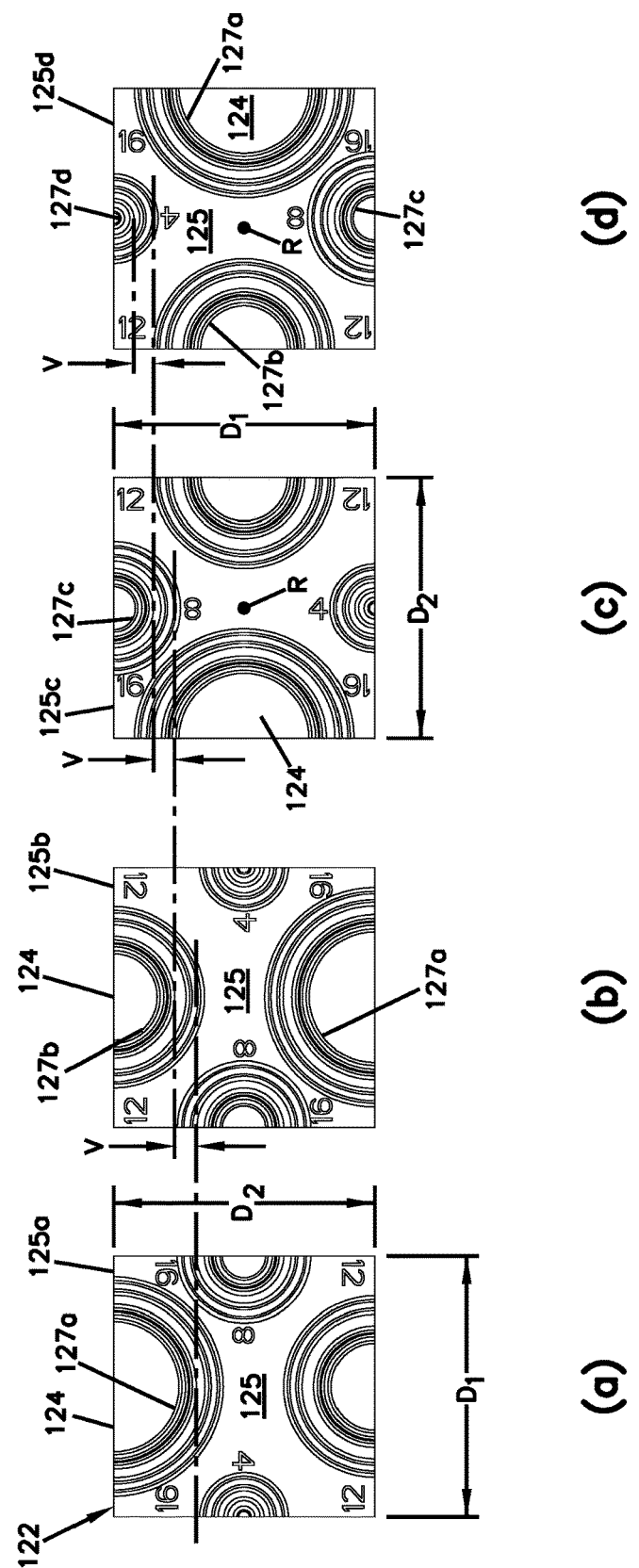
FIG. 5 shows the sealing block of FIG. 4 in four different rotational orientations.

As shown in FIG. 4, the sealing block 122 can have a generally cuboid shape having a first dimensional distance D1 (e.g., a width, a height, a depth), a second dimensional distance D2 (e.g., a width, a height, a depth), and a third dimensional distance D3 (e.g., a width, a height, a depth). First and second parallel ends of the containment wall sections 125 extend along the first dimensional distance D1. Third and fourth parallel ends of the containment wall sections 125 extend along the second dimensional distance D2. The thickness of the containment wall sections 125 and the volume of sealant 124 extend along the third dimensional distance D3. In certain implementations, the first dimensional distance D1 is about the same as the second dimensional distance D2.

As further shown in FIG. 4, the external surfaces of the sealant 124 that extend along the first and second dimensional distances D1, D2 are exposed between the containment wall sections 125. Each of the exposed surfaces is configured to function as a cable contact surface 128. Accordingly, the sealing block 122 can be positioned in any orientation that results in one of the exposed surfaces being aligned with a cable port 105 to define a cable passage P (FIG. 2). The sealing block 122 is configured to be movable relative to the spring element 123. For example, the sealing block 122 can be a separable from the spring element 123. Accordingly, the sealing block 122 can be rotated about an axis of rotation R relative to the spring element 123 and sealing block mount 110 to position any of the sealant surfaces as the cable contact surface 128.

In some implementations, the third dimensional distance D3 is about the same as the first and second dimensional distances D1, D2 (i.e., the sealing block 122 is cube shaped). In certain implementations, the sealing block mount 110 of the enclosure 100 can define a first cable port 105 facing in a first direction and a second cable port 105 facing in a second direction (e.g., can be disposed at a corner). In such implementations, the sealing block 122 is rotatable about an axis that is orthogonal to the axis of rotation R so that the containment wall sections 125 can selectively face the first cable port 105 and the second cable port 105. Accordingly, the enclosure 100 is selectively configurable in any one of an in-line cable configuration, a butt-style cable configuration, or an angled cable configuration by routing a cable through selected ones of the cable ports 105.

In accordance with some aspects of the disclosure, each containment wall section 125 of the sealing block 122 defines a plurality of port edges 125a-125d. Each port edge 125a-125d defines a notch 127 that cooperates with a notch 127 on a containment wall section 125 of an opposing sealing block 122 to define a cable port 126 (FIG. 2). In certain implementations, each port edge 125a-125d defines one notch 127a-127d. In the example shown in FIG. 4, each containment wall section 125 defines a first port edge 125a, a second port edge 125b, a third port edge 125c, and a fourth port edge 125d.

The notches 127 defined by the containment wall sections 125 on opposite sides of the sealant 124 align along respective cable passages P (e.g., see FIG. 4). For example, FIG. 4 shows one cable passage P extending between notches 127b, 127b defined in the port edges 125b, 125b of opposing containment wall sections 125, 125 of a sealing block 122; and another cable passage P extending between notches 127d, 127d defined in the port edges 125d, 125d of the opposing containment wall sections 125, 125 of the sealing block 122.

In accordance with certain aspects of the disclosure, the notches 127a-127d of a containment wall section 125 are different sizes. Accordingly, the notches 127a-127d of two opposing sealing blocks 122 can cooperate to form cable ports of different diameters to accommodate various sizes of cables. For example, FIGS. 5a-5d illustrates one example sealing block 122 disposed in four different positions. In a first position as shown in FIG. 5a, a first port edge 125a faces upwardly and defines a large notch 127a. The notches 127b-127d of the other port edges 125b-125d are smaller than the large notch 127a. In a second position as shown in FIG. 5b, a second port edge 125b faces upwardly and defines an intermediate notch 127b. In a third position as shown in FIG. 5c, a third port side 125c faces upwardly and defines a smaller notch 127c. In a fourth position as shown in FIG. 5d, a fourth port side 125d faces upwardly and defines a smallest notch 127d.

In certain implementations, the containment wall sections 125 include spring members 129 disposed at the notches 127 to provide tolerance at the cable port 126 for various cable sizes within a range. In certain examples, each spring member 129 defines the notched surface 127a-127d and the notched surfaces 127a-127d are movable relative to a remainder of the containment wall section 125. For example, each spring member 129 may be compressible radially outwardly along a plane parallel to a major surface of the containment wall section 125 (e.g., along the first dimensional distance D1 or along the second dimensional distance D2). Accordingly, the notched surface 127a-127d can move radially by a diameter variance distance V (FIG. 5) to enlarge the resulting cable port 126. In one example, each spring member 129 includes a resilient U-shaped fold. In another example, each spring member 129 includes a resilient S-shaped fold. In other examples, the spring member 129 can have other resilient forms. In the example shown, the spring members 129 are monolithically formed with the corresponding containment wall section 125. In other examples, the spring members 129 can be otherwise coupled to the containment wall sections 125 (e.g., overmolded, welded, etc.).

Figure 6:
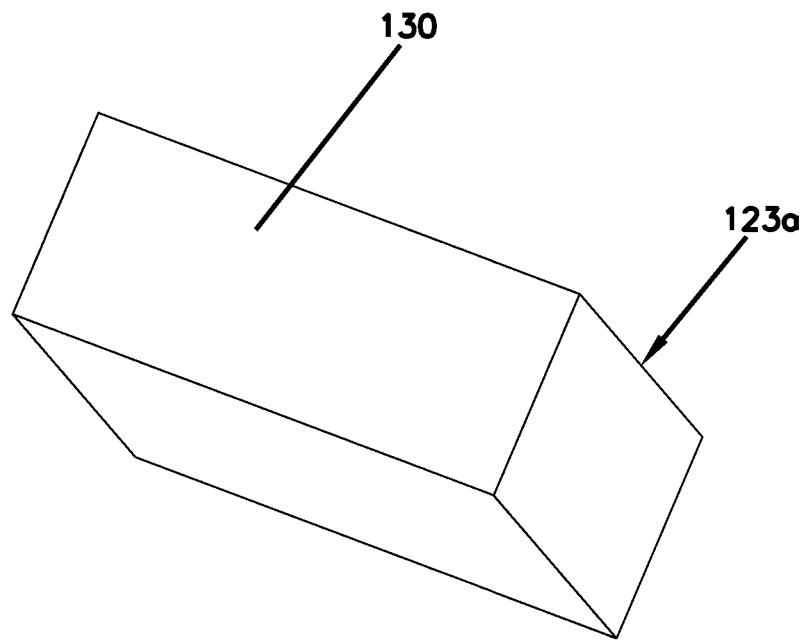
FIG. 6 is a perspective view of a first example spring element including a foam block.
Figure 7:
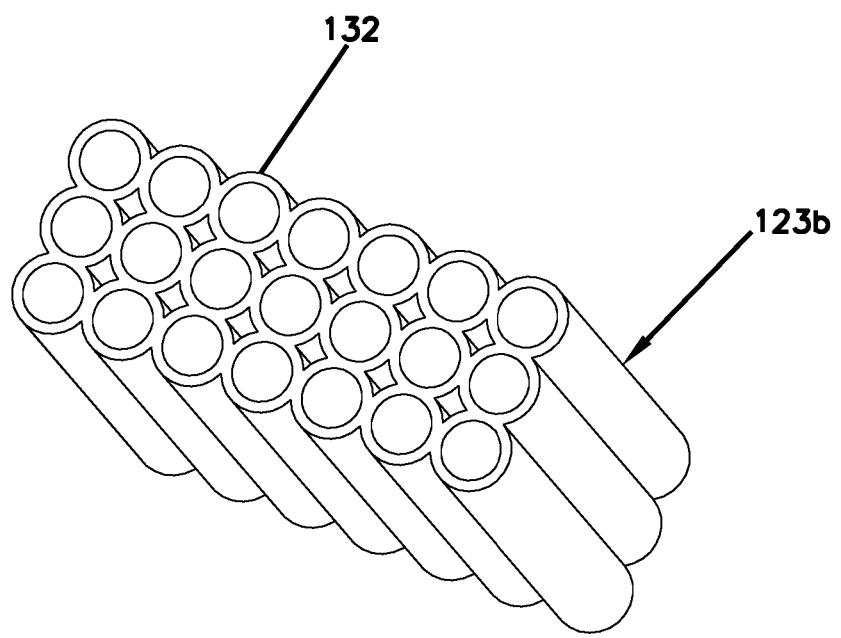
FIG. 7 is a perspective view of a second example spring element including a tube assembly.
Figure 8:
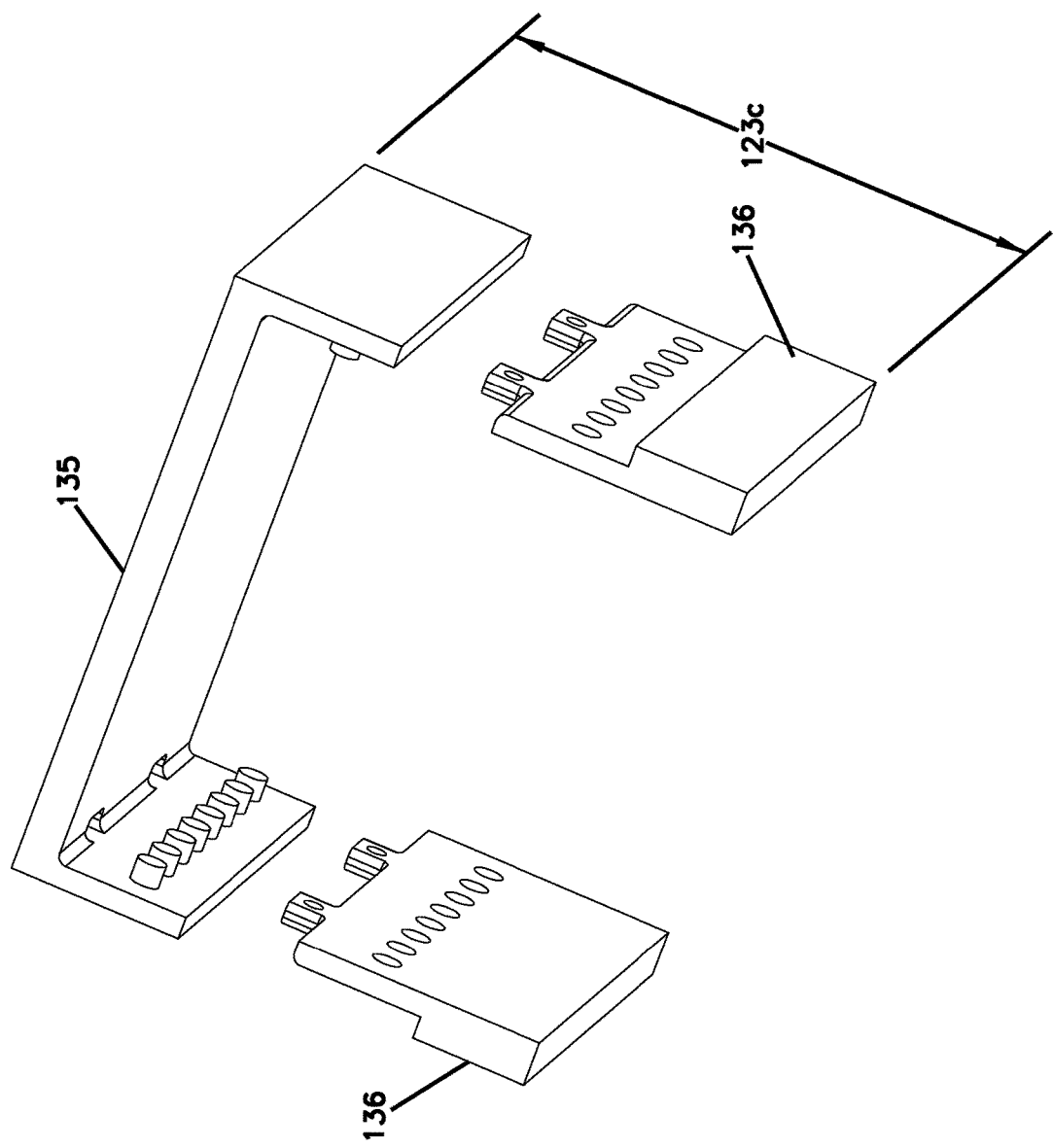
FIG. 8 is a perspective view of a third example spring element including a trampoline.

FIGS. 6-8 illustrate three example implementations of a spring element 123. In certain implementations, the spring element 123 is configured to bias the sealant volume 124 away from the spring element 123. In certain examples, each unit 120 includes a first spring element 123 disposed between the first volume of sealant 124 and the base 101 and a second spring element 123 disposed between the second volume of sealant 124 and the cover 102. In certain implementations, the containment wall sections 125 directly contact the spring element 123 (see FIG. 2). In other implementations, a portion of the volume of sealant 124 is disposed between the containment wall sections 125 and the spring element 123.

A first example spring element 123a includes a foam block 130 as shown in FIG. 6. Displacement of the volume of sealant 124 compresses at least part of the foam block 130.

A second example spring element 123b includes a plurality of tubes 132 as shown in FIG. 7. Displacement of the volume of sealant 124 compresses at least part of the tubes 132. In certain examples, the tubes 132 are hollow or filled with air. In other implementations, the tubes 132 are filled with a compressible material. In some implementations, the tubes 132 are monolithically formed. In other implementations, the tubes 132 are fixed together with a webbing. In still other implementations, the tubes 132 are held together by an external containment element (e.g., portions of the base 101 and cover 102).

A third example spring element 123c includes a trampoline 135 as shown in FIG. 8. The trampoline 135 extends between at least two support members 136 that elevate the trampoline 135 to provide a deflection space into which the trampoline 135 can flex. Displacement of the volume of sealant 124 flexes the trampoline 135 so that the volume of sealant 124 and trampoline 135 move into the deflection space.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

LIST OF REFERENCE NUMERALS AND CORRESPONDING FEATURES 100 enclosure housing
101 base
102 cover
105 cable port
110 sealing block mount
120 cable sealing unit
121 cable sealing arrangement
122 sealing block
123 spring element
124 volume of sealant
125 containment wall section
125a-125d port edges
126 cable port
127, 127-127d notches
128 cable contact side
129 spring member
130 foam block
132 tubes 135 trampoline
136 support member
D1 first dimensional distance
D2 second dimensional distance
D3 third dimensional distance
P cable passage
R axis of rotation

What is claimed is:

1. A sealing unit comprising:
a sealant arrangement including first and second volumes of sealant that meet at a cable sealing interface;
a sealant containment wall positioned at an outer side of the sealant arrangement, the sealant containment wall including a first wall section providing containment of the first volume of sealant at the outer side of the sealant arrangement and a second wall section providing containment of the second volume of sealant at the outer side of the sealant arrangement, the first and second wall sections meeting at a boundary that generally aligns with the cable sealing interface, the first and second wall sections each including at least first and second edges, the first edges of the first and second wall sections defining first notches having a first notch size, the second edges of the first and second wall sections defining second notches having a second notch size that is larger than the first notch size, the first and second wall sections being capable of being arranged in a first configuration where the first edges meet at the boundary and the first notches cooperate to define a first cable port having a first port size, and the first and second wall sections being capable of being arranged in a second configuration where the second edges meet at the boundary and the second notches cooperate to define a second cable port having a second port size that is larger than the first port size;
one or more spring elements configured to apply a spring load to the first and second volumes of sealant.

2. The sealing unit of claim 1, wherein the first wall section is bonded to an outer side of the first volume of sealant and the second wall section is bonded to an outer side of the second volume of sealant.

3. The sealing unit of claim 1, wherein the sealant containment wall is a first sealant containment wall, and wherein a second sealant containment wall is positioned at an inner side of the sealant arrangement, and wherein the first and second sealant containment walls have the same configuration.

4. The sealing unit of claim 1, further comprising an enclosure defining a sealing block mount for receiving the sealing unit.

5. The sealing unit of claim 4, wherein the sealing block mount includes a first pocket for receiving the first volume of sealant and a second pocket for receiving the second volume of sealant, the first pocket being defined by a first housing piece of the enclosure and the second pocket being defined by a second housing piece of the enclosure.

6. The sealing unit of claim 5, wherein the first and second housing pieces meet at a sealed interface including a perimeter seal pressed between the first and second housing pieces.

7. The sealing unit of claim 6, wherein the perimeter seal contacts the first and second volumes of sealant of the sealant arrangement.

8. The sealing unit of claim 1, wherein the first and second wall sections are rectangular plates having four edges which include the first edge, the second edge, a third edge, and a fourth edge, the third edges defining third notches having a third notch size larger than the second notch size.

9. The sealing unit of claim 8, wherein the fourth edges define fourth notches having a fourth notch side larger than the third notch size.

10. The sealing unit of claim 1, wherein each of the first and second wall sections include spring elements at the first and second notches, the spring element being compressible radially along the first and second notches.

11. The sealing unit of claim 10, wherein each spring element is monolithically formed with the corresponding wall section.

12. A sealing unit comprising:
a first sealing block including a first volume of sealant sandwiched between first and second wall sections, each of the first and second wall sections defining a plurality of notches, the notches of the first wall section being aligned with the notches of the second wall section with an exterior surface of the first volume of sealant extending therebetween, the notches of each wall section having different sizes; and
a second sealing block including a second volume of sealant sandwiched between first and second wall sections, each of the first and second wall sections of the second sealing block defining a plurality of notches, the notches of the first wall section of the second sealing block being aligned with the notches of the second wall section of the second sealing block with an exterior surface of the second volume of sealant extending therebetween, the notches of each wall section of the second sealing block having different sizes, each of the notches of the second sealing block corresponding in size to one of the notches of the first sealing block.

13. The sealing unit of claim 12, further comprising a first spring element and a second spring element configured to be disposed at opposite sides of the sealing unit.

14. The sealing unit of claim 12, wherein each of the containment wall sections defines four notches.

15. The sealing unit of claim 12, wherein each of the containment wall sections includes a spring member at each notch.

16. The sealing unit of claim 12, wherein each containment wall section is bonded to an external side of the respective volume of sealant.

17. An enclosure comprising:
a first housing piece defining a first receptacle at which is defined a first notch;
a second housing piece defining a second receptacle at which is defined a second notch sized to cooperate with the first notch to define a cable port leading to an enclosure interior; and
a sealing unit disposed in the first and second receptacles, the sealing unit including:
a containment wall defining a cable port leading to a cable interface between first and second volumes of sealant;
a first spring element disposed in the first receptacle;
a second spring element disposed in the second receptacle;
a first sealing block seated on the first spring element within the first receptacle, the first sealing block including a first containment wall section and the first volume of sealant, the first containment wall section having external edges that each define a notch, each of the notches of the first containment wall section being sized differently than the other notches of the first containment wall section; and a second sealing block seated on the second spring element within the second receptacle, the second sealing block including a second containment wall section and the second volume of sealant, the second containment wall section having external edges that each define a notch, each of the notches of the second containment wall section being sized differently than the other notches of the second containment wall section;

wherein the first containment wall section and the second containment wall section cooperate to define the containment wall of the sealing unit;

the sealing unit being configurable to set an inner diameter of the cable port without adding material to or removing material from the sealing unit.

18. The enclosure of claim 17, wherein the first containment wall section is bonded to the first volume of sealant.

19. The enclosure of claim 17, wherein the sealing unit includes two parallel containment walls disposed on opposite sides of the first and second volumes of sealant.

20. A sealing block comprising:
a first wall section defining a plurality of notches at edges of the first wall section, each notch of the first wall section having an open face at one of the edges of the first wall section, the notches of the first wall section having different sizes from each other, the first wall section also including spring members disposed at the notches to enable movement of the notches relative to the respective edges to provide tolerance for various cable sizes within a range;

a second wall section defining a plurality of notches at edges of the second wall section, each notch of the second wall section having an open face at one of the edges of the second wall section, each notch of the second wall section being sized alike and aligned with one of the notches of the first wall section, the second wall section also including spring members disposed at the notches of the second wall section to enable movement of the notches relative to the respective edges to provide tolerance for various cable sizes within a range; and a volume of sealant sandwiched between the first and second wall sections.

21. The sealing block of claim 20, wherein each of the first and second wall sections defines a total of four notches.

\* \* \* \* \*